United States Patent [19]

Risemberg

[11] Patent Number: 5,920,845
[45] Date of Patent: Jul. 6, 1999

[54] DATE MATCHING METHODS

[76] Inventor: Rafael Risemberg, 82 Charles St. #2R, New York, N.Y. 10014

[21] Appl. No.: 08/832,955

[22] Filed: Apr. 4, 1997

[51] Int. Cl.[6] .................................................... G06F 19/00
[52] U.S. Cl. ................................................................ 705/1
[58] Field of Search ........................... 709/8, 7, 9; 705/1

[56] References Cited

U.S. PATENT DOCUMENTS

| | | | |
|---|---|---|---|
| 4,173,016 | 10/1979 | Dickson | 342/42 |
| 4,847,890 | 7/1989 | Solomon et al. | 379/88.21 |
| 5,086,394 | 2/1992 | Shapira | 705/1 |
| 5,653,065 | 8/1997 | McILwain | 52/65 |
| 5,681,046 | 10/1997 | Lawrence | 273/459 |
| 5,775,695 | 7/1998 | Byers | 273/161 |

OTHER PUBLICATIONS

Chesanow, Neil "Meeting Men. A Consumer's Guide to Shopping for that Significant Other", New Woman pp. 112–155, Jun. 1990.

Thornton, Emily "Video Dating in Japan" Fortune. p. 12, Jan. 24, 1994.

*Primary Examiner*—Allen R. MacDonald
*Assistant Examiner*—Penny Caudle
*Attorney, Agent, or Firm*—Goldstein & Canino

[57] ABSTRACT

A means and method for use at a date matching event to determine, in a discreet manner, the date preferences of a plurality of participants. The method includes gathering the plurality of participants at the date matching event, and assigning a unique identification code to each participant. The identification code is worn or otherwise displayed in plain sight, being readily observable by a plurality of the other participants. Each applicant may next, if time permits, be provided a temporal period to introduce themselves to the other participants, which is followed by a temporal interval for applicants to interact. After an interval for interaction, the date preferences of each participant are discreetly collected and analyzed to determine all occurring mutual matches. The mutual match results are then delivered to the participants, wherein matched participants may then meet to discuss the arrangements for their date.

8 Claims, 5 Drawing Sheets

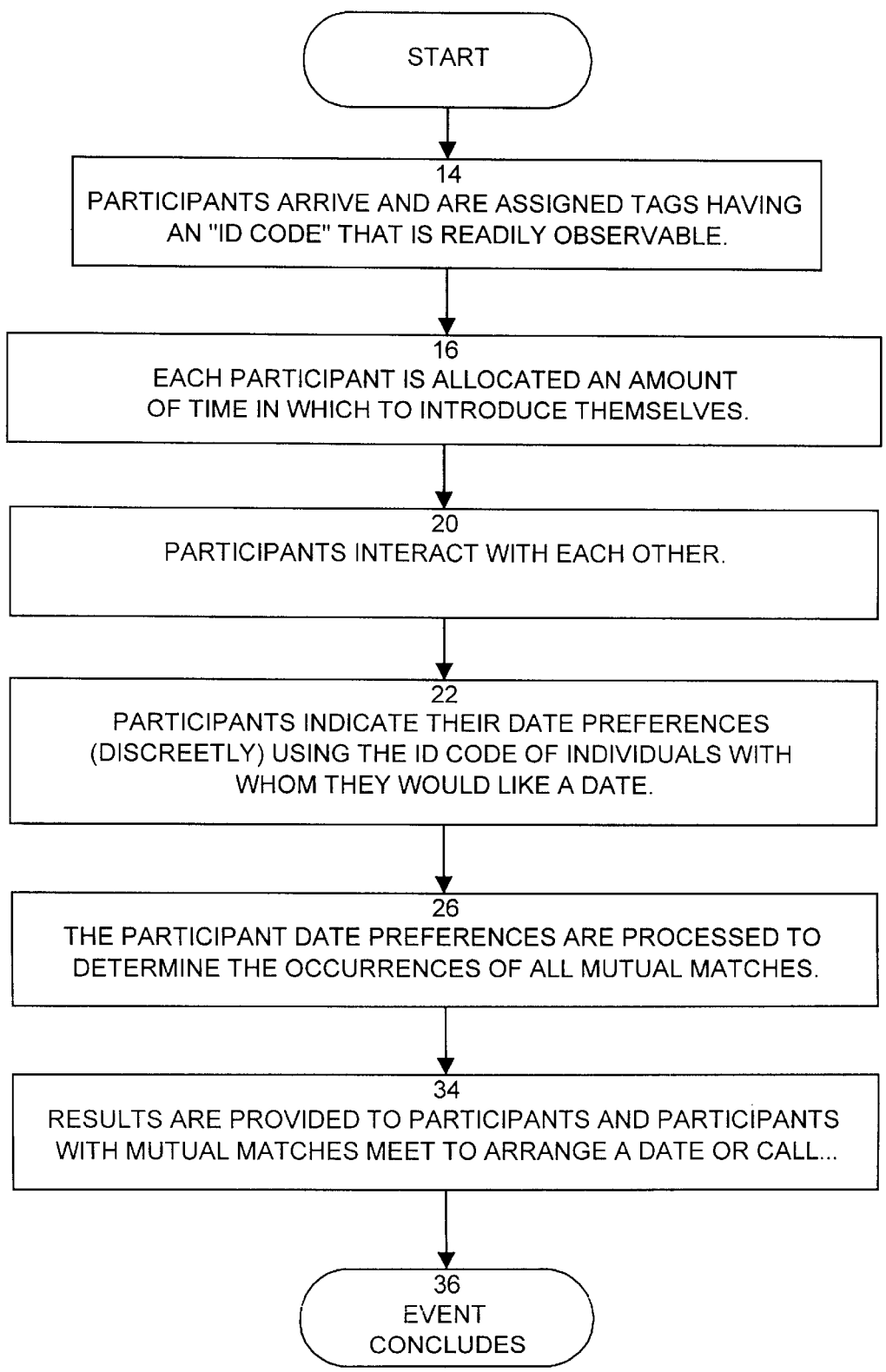

DATE MATCHING METHODS

BACKGROUND OF THE INVENTION

1. Field of the Invention

The invention generally relates to methods for date matching. More particularly, the present invention provides methods and means that enable the rapid date matching of single participants, while minimizing the embarrassment of rejection.

2. Background and Objects of the Invention

Individuals that would like to meet and date other individuals are presently provided by with plurality of well known methods to attempt to do so. Dance clubs, social clubs, bars, and the like, are known approaches to meeting other individuals. Often, however, these locations are flooded with loud music and a significant level of background noise. They can also be impersonal and foreign for infrequent patrons. As a result, these establishments are most inviting to younger individuals, or for the planned meeting of a group of persons. It can further be noted that the possibility of rejection, especially in a crowded club or bar room, makes such places quite intimidating to many single persons. Accordingly, most singles find the club/bar option unattractive. Another well known approach employed by individuals is the use of the "personals" section of daily and weekly newspapers. This method requires a considerable passage of time before a date is typically arranged, and further, does not provide for mingling, which can quickly aid a person in deciding if they are interested in dating another individual. As such, the personal advertisement approach is lacking in the ability to "fully assess" an individual before committing to (or even considering) a date. The need to provide an interactive situation to mingle and enter into casual conversation before committing to a date is especially desirable.

A primary problem with blind dates, and the like, even when produced by a commercial dating service or personal ad, is that the two individuals do not have an opportunity to (casually and informally) meet in a non-date atmosphere. Although, a dating service may typically include the exchange of photographs or video tapes, and provide for telephone conversations, they do not generally enable individuals to personally meet and mingle in a non-date, relaxed environment. Further, improved methods are especially needed for individuals who desire to avoid, or minimize, the embarrassment of rejection.

Accordingly, objects of the present invention are, therefore, to provide new and improved date matching means and methods having one or more of the following capabilities, features, and/or characteristics:

- simple and logistically practical methods for date matching;
- rapid date matching methodology wherein the participants are able to select date preferences within a relatively short period (for example, on the order of hours versus days or weeks);
- enable participant introduction and interaction before a date is attempted;
- minimizes or eliminates the embarrassment associated with rejection or refusal;
- provides an opportunity to meet and assess, discreetly, one or more participants;
- methods realized with low to moderate cost overhead;
- compatible with the computer generation of date matching results;
- personalized "date match results" deliverable in a very discreet manner;

The above listed objects, advantages, and associated novel features of the present invention, as well as others, will become more clear from the description and figures provided herein. Attention is called to the fact, however, that the drawings are illustrative only. Variations are contemplated as being part of the invention, limited only by the scope of the appended claims.

SUMMARY OF THE INVENTION

In accordance with the invention, date matching methods are provided. A preferred embodiment of the method provides for the gathering of a plurality of participants, for example at a date matching event. Each participant is assigned a unique identification code, which is placed or worn in plain sight, being readily observable by a plurality of the other participants. The participants are then provided an environment to facilitate their interaction. Typically, a pre-determined temporal interval (time period) is provided for the interaction. Next, the date preferences of each participant are determined, each date preference indicating the desire of one participant to date another. The date preferences are then processed to determine mutual matches of participants. A mutual match is said to occur when at least two participants designate each other as date preferences. The participants are then informed of the mutual matches, and the matched participants may meet to plan their date. The determining of the date preferences of participants may be expedited by the use of date matching cards, wherein each participant may discreetly provide a (possibly prioritized) list of participants with whom a date is desired. Further, a computing means may be provided to receive, process, and analyze the date preferences of the participants to determine a match summary including a listing of the mutual matches determined.

BRIEF DESCRIPTION OF THE DRAWINGS

In the drawings, like elements are depicted by like reference numerals. The drawings are briefly described as follows.

FIG. 1A provide a flow chart of a preferred embodiment of the present invention that is particularly suited for use with a small plurality of participants.

LIST OF REFERENCE NUMERALS USED IN THE DRAWINGS

Figure 1B:
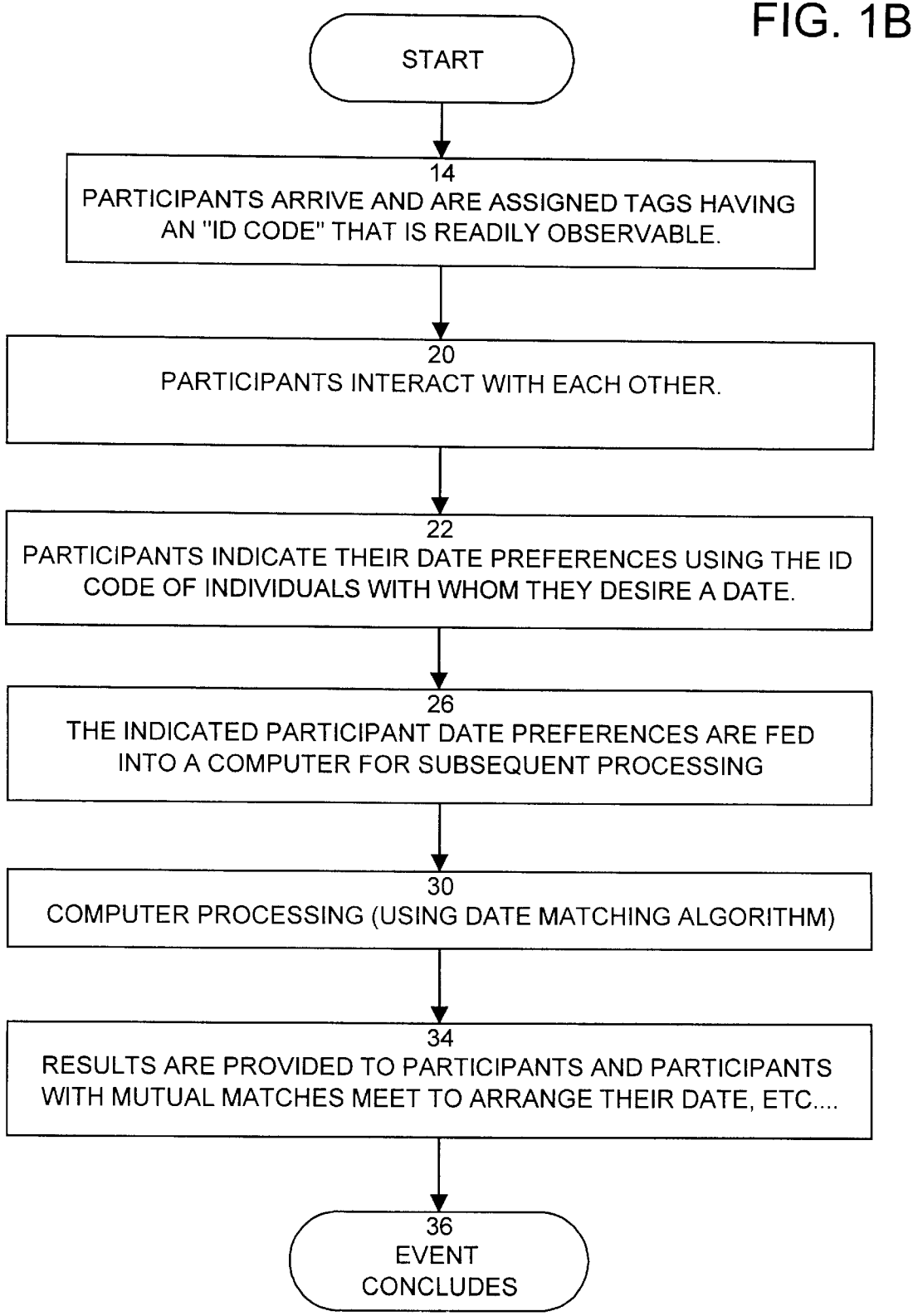
FIG. 1B provides a flow chart of a preferred embodiment of the present invention, which may be employed with a moderate to large plurality of participants.

| | |
|---|---|
| 40 | date preference cards |
| 42 | card reader (scanner) |
| 44 | computing means |
| 46 | results printer |
| 50 | match summary |

| | |
|---|---|
| 50a | message slips |
| 52 | (participant) seats |
| 56a | main meeting (introduction) room |
| 56b | mingle room |

DETAILED DESCRIPTION OF THE PREFERRED EMBODIMENTS

It is important to establish the definition of several important terms that will be used throughout this disclosure. The term "participant" is intended to pertain to a person or individual who attends and participates in a date matching session or event wherein the present invention is employed. As such, each participant attending such a gathering is attempting to secure a date with another compatible, or seemingly compatible, participant. The term "date preference" will be applied to indicate when one participant desires a date with another participant. This must be distinguished from the term "mutual match", which results when two or more participants indicate date preferences for each other. For example, a mutual match occurs (or exists) if a first participant indicates a second participant as a date preference, and additionally the second participant indicates the first as a date preference.

Referring now to FIG. 1A, there is depicted a linear flowchart of a preferred embodiment of a method of the present invention. The embodiment of FIG. 1A is especially suited for use with relatively small groups of participants. For example, the method may be practiced (conveniently) with a group of, say, 10 to 200 persons. The method may begin with the arrival of a plurality of participants at 14 (of FIG. 1), and the assigning of a unique identification code to each participant. In a preferred embodiment the identification (ID) code may be displayed via a tag. The assigned ID code is placed or worn in plain sight, being readily observable, by a plurality of the other participants. The code may comprise an arbitrary symbol, or may include items such as the first and or last name of the participant, possible sexual preferences of each respective participant, or any other data not recited hereat. Next, if time permits, participants may be allocated, at 16, a temporal interval (i.e., a period of time) for each participant to speak about and generally introduce themselves to the other participants. To enable the participants to readily observe each other, a plurality of seats 52 may be provided as a seating arrangement 56a as illustrated in FIG. 2. The seating arrangement 56a would position the plurality of participants so as to enable each respective participant to observe substantially all other participants. Accordingly, in a preferred embodiment, participants would observe other participants via line of sight observation.

It should be noted that when the present date matching invention is employed on a larger scale, video equipment including video cameras and large screen displays may be utilized to aid in the observation of one participant by others at the event. It is further contemplated that when employed with a very large plurality of participants, say, several hundred or more, the present invention may be practiced by "linking" a number of locations (or rooms) where the date matching events are being conducted. For example, by employing audio/video links supported by a local area network (LAN), or a wide area network (WAN), a large plurality of participants at one location may be linked (in real time) to other participants at other locations.

Returning to FIG. 1, next at 20, the plurality of participants are allocated a temporal interval to interact with each other, such as, for example, by mingling, dancing, and/or conversing with a plurality or the other participants. The interaction may be realized by moving the participants to smaller mingle rooms with seats 52 provided in seating arrangements 56b, as depicted in FIG. 2, or by providing a standing (only) location, where, for example, beverages and snacks are served. Regardless of the specifics of the location chosen for the interaction of participants, an associated temporal interval may provided to enable participants to interact with a plurality of the other participants. In a preferred embodiment of the invention employed with smaller groups, each participant would be able to meet and mingle with most of, if not all of, the other participants at the dating event. Subsequent to the portion of the event dedicated to interaction, each participant is provided with means for indicating date preferences at 22. That is, each participant is provided means to indicate, discreetly, one or more participants with whom a date is desired. In a preferred embodiment of the invention, especially when the number of participants at a particular event is large, the means to indicate date preferences may be provided by a plurality of date preference cards 40 of FIGS. 3A and 3B. The date preference cards 40 would be provided to enable each respective participant to indicate a (possibly prioritized) list of other participants with whom a date is desired. It should be noted that the means for indicating date preferences, possibly by way of date preference cards 40, enables the discreet determining of the date preferences of each participant with the possibility of open rejection virtually eliminated. The use of the assigned ID codes provides for the easy, concise, and possibly "machine supported" determining of the date preferences of the participants. Once determined, the date preferences indicated by the participants may be processed to determine "mutual matches". The term mutual match (or matches) is to be defined as occurring when two participants select each other as date preferences. A mutual match, however, does not occur if a first participant indicates a preference for a second participant, while the second participant does not indicate a preference for the first. The determined mutual matches are then indicated to the matched participants to enable them to meet and plan their date, or at minimum, arrange a telephone call to discuss a date.

Figure 2:
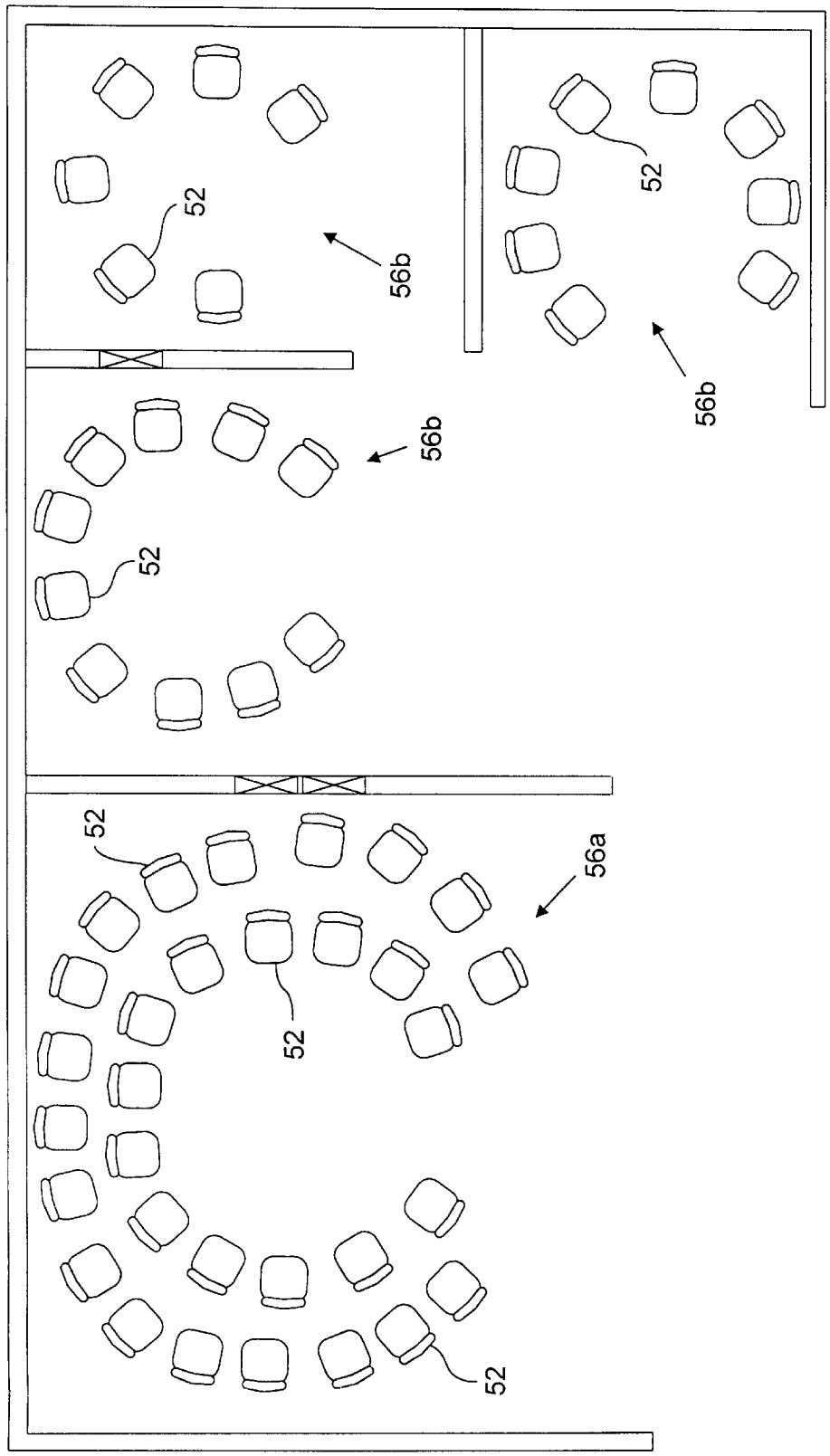
FIG. 2 depicts a plan view of possible seating arrangements that may be employed with the invention.

Referring now to FIG. 1B, there is provided a second embodiment of the present invention, which may be preferred for use with large plurality of participants. This method omits step 16 of FIG. 1A, and further provides for the use of a computing means at steps 26, 30 and possibly 34. As shown, in a preferred embodiment, after the date preferences are fed into a computer at 26, computer processing commences at 30 to determine, among other items, all occurring mutual matches of participants. The mutual matches may be determined by processing and analysis conducted by one or more computer algorithms, which are known in the art, that are executed (run) on a suitable computer, such as computing means 44 of FIGS. 3A and 3B. At 34, the results (of the processing and analysis) may be printed by a results printer 46 and provided to the matched participants to enable them to meet and plan their date. This arrangement, employing a computing means 44, and several exemplary architectures to expedite the determining of date preferences and the associated mutual matches, will be addressed further below when referring to FIGS. 3A and 3B. The date matching event may then be concluded at 36.

The information included in the printed results (e.g., match summary 50) may provide a listing of the respective mutual matches, the input date provided by the date preference cards (or another suitable means for indicating date preferences), the total number of participants, the percentage of participants who secured a date, etc. Skilled individuals can provide yet other items to be included in such an analysis or results summary. Also, it should be understood that at 34 of FIG. 1A or 1B, the participants may be informed of mutual matches by a telephone call after the event. Alternately, participants may be informed of mutual matches in a printed form such as a message slip 50a (of FIG. 3A). Consider, as an example of the latter, an arrangement wherein small slips 50a are printed for each participant. Each said slip 50a may include information such as the ID code of the participant the slip is intended for, the name of said individual, and the ID code of a second mutual matching participant and possibly that individual's name and/or phone number. It is further contemplated that the slip 50a may also include a message directing the respective matched participants to a specific location (e.g., a numbered cubicle) to plan their upcoming date in a semi-private location. Semi-private locations may also be established by using (possibly portable) partitions, including self-standing partitions, that define or provide partition formed spaces. Accordingly, it is contemplated that the arrangements of seats 52 of FIG. 2, and the above discussed semi-private locations, may be formed by portable items which may be moved from one date event location to another, as required.

Figure 3A:
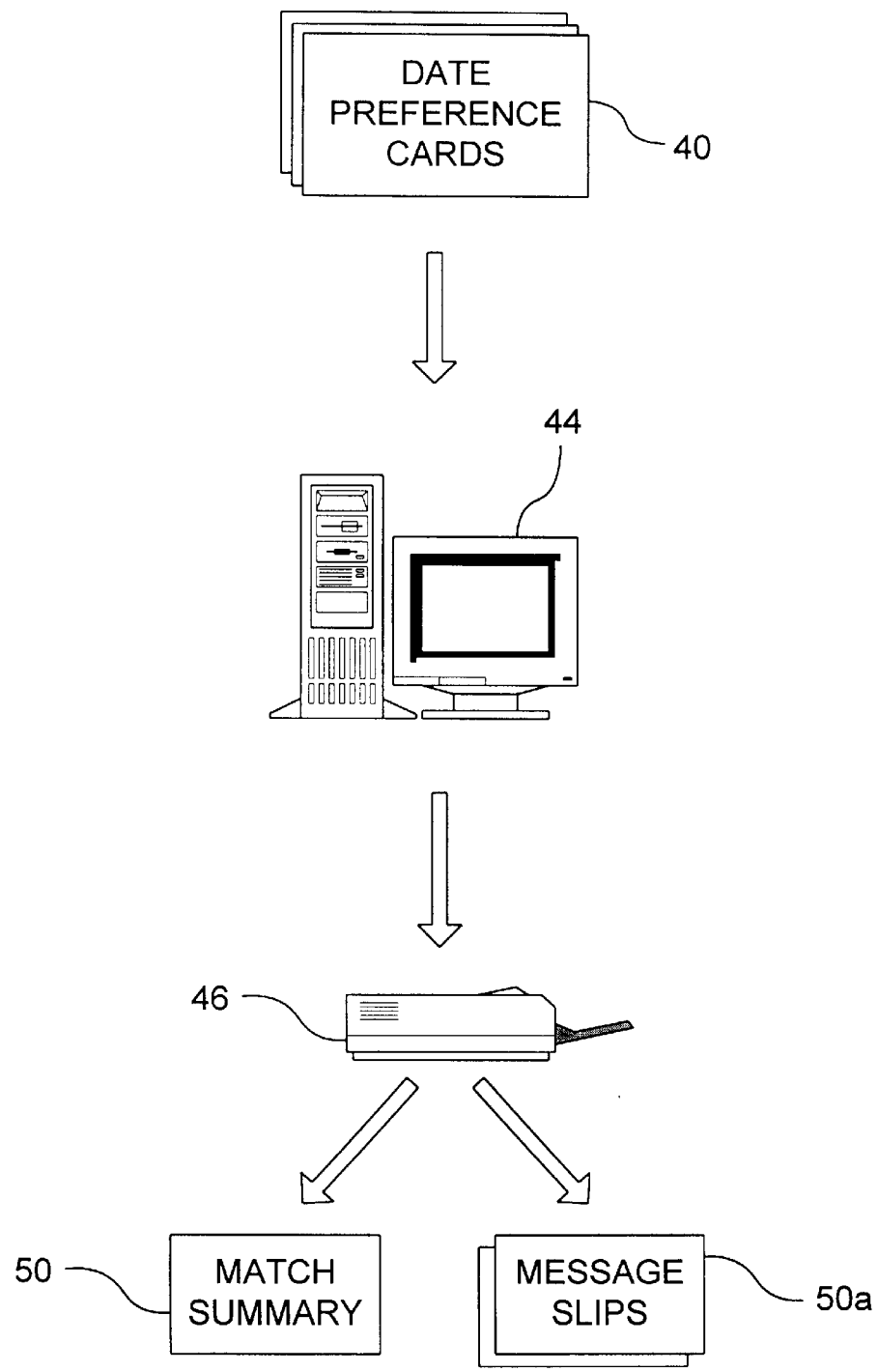
FIG. 3A illustrates a functional diagram of an architecture suitable for processing a plurality of date preference cards completed by participants at a date matching event.
Figure 3B:
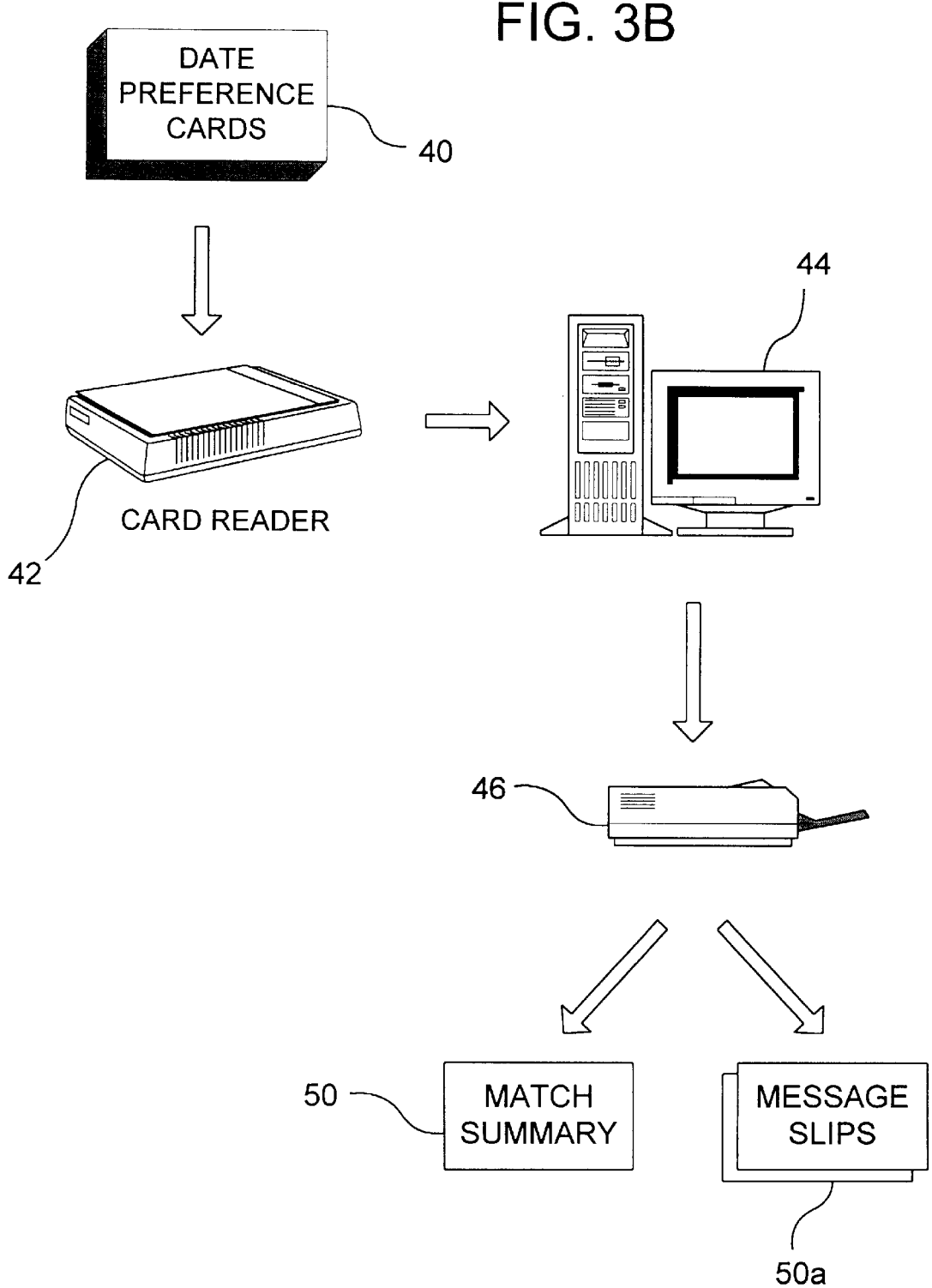
FIG. 3B depicts a more automated arrangement that may be employed to process a large number of date preference cards, or the like, according to the present invention.

Several arrangements suitable for processing and analyzing the means for indicating participant date preferences are illustrated in FIGS. 3A and 3B. A computing means 44 may be arranged to receive (and store) the date preferences of the participants. In a most preferred embodiment the computing means 44 would be provided by a general purpose computer configured to execute an application program in accordance with the present invention. As shown, a plurality of date preference cards 40 may be utilized for the participants to record their date preferences. The date preference cards 40 may then be manually entered into the computing means 44, as depicted in FIG. 3A, or alternately, scanned/read in an automated higher speed fashion. As can be seen in FIG. 3B, means for automated reading of the date preference cards 40 may provided by a card reader 42. After the information of the date preference cards 40 has been input, the processing of the information may commence to determine, among other items, the mutual matches of participants. Once the processing is complete, the computing means 44 may employ a results printer 46, which is operatively coupled to the computing means 44, to print the match summary 50. In addition to the match summary 50, or in place of said summary, the results printer 46 (or another suitable printing or output device) may provide message slips 50a for each respective participant. The definition, function, and general description of the match summary 50 and the message slips 50a, are as discussed above.

It is important to note that the use of the card reader 42, the computing means 44, and the like, which may be most preferable when the number of participants is large, would enable a significant reduction in the time required to read (input) the date preferences and process said preferences to determine the associated mutual matches. Further, many other approaches may be supplied by skilled individuals to provide the equivalent functions of the date preference cards 40 and the card reader 42. For example, the computing means 44 may be configured with a communication interface (not shown) to support the reception of information provided by hand-held "preference indicating" units. Further, the indicating units may communicate with the computing means 44 by way of wireless RF or optical links.

Accordingly, skilled individuals will appreciate the large plurality of yet other possible embodiments that may be employed.

While there have been described the currently preferred embodiments of the present invention, those skilled in the art will recognize that other and further modifications may be made without departing from the present invention, and it is intended to claim all modifications and variations as fall within the scope of the invention.

What is claimed is:

1. A method for use at a date matching event attended by a plurality of participants, the method comprising:

(a) assigning an identification code to each participant, the identification code placed in plain sight, being readily observable by a plurality of the other participants;

(b) facilitating interaction of participants;

(c) supplying to each participant a date preference card for indicating, discreetly, at least one date preference, each date preference designating a participant with whom a date is desired, said card enables each respective participant to indicate a prioritized list of other participants with whom a date is desired by recording one or more assigned participant identification codes; the date preference card is computer scannable to support the automated input of the listed participant identification codes;

(d) collecting said date preference card for indicating date preferences;

(e) processing, using a general purpose computing system, each collected date preference card for indicating date preferences to determine mutual matches of participants; each mutual match indicating at least two participants who requested each other for a date preference; and (f) informing the participants of the mutual matches to enable them to plan their date.

2. The method according to claim 1, including the additional steps of scanning a plurality of the date preference cards and processing information produced by said scanning, the processing to provide a match summary to indicate date preferences and associated mutual matches of participants.

3. The method according to claim 2, wherein the scanning and processing is supported by the inclusion of a general purpose computing system.

4. The method according to claim 3, wherein the match summary is generated by a results printer operatively coupled to a computing means, the match summary including thereon a list of mutual matches.

5. The method according to claim 4, wherein the indicating of date preference mutual matches is provided as printed message slips, one slip provided to each participant submitting a respective date preference sheet.

6. The method according to claim 4, wherein the mutual matches are communicated to the plurality of participants via a telephone call after the event has ended.

7. The method according to claim 5, wherein the printed slips direct respective matched participants to a semi-private location to discuss and plan their date.

8. A method supporting the date matching of a plurality of participants attending a dating service event, the method comprising:

(a) gathering the plurality of participants at the dating service event;

(b) assigning a unique identification code to each participant, the identification code placed in plain sight, being readily observable by a plurality of the other participants;

(c) positioning the participants to enable each respective participant to observe substantially all other participants, and providing a temporal interval for each person to speak about, and generally introduce themselves to the other participants;

(c) facilitating interaction of participants;

(d) determining the date preferences of each participant using a date preference card, each date preference of a respective participant designating at least one other participant with whom a date is desired, said card enables each respective participant to indicate a prioritized list of other participants with whom a date is desired; the date preference cards are computer readable to support the automated input of the indicated date preferences of the participants in a relatively short period time;

(e) reading the date preference cards and processing the determined date preferences to provide a match summary indicating the date preferences and associated mutual matches of the participants, using a general purpose computing system having a results printer operatively coupled thereto; each mutual match indicating at least two participants who designated each other as date preferences; and (f) informing the participants of the mutual matches to enable them to plan their date.

\* \* \* \* \*